US006980992B1

(12) United States Patent
Hursey et al.

(10) Patent No.: US 6,980,992 B1
(45) Date of Patent: Dec. 27, 2005

(54) TREE PATTERN SYSTEM AND METHOD FOR MULTIPLE VIRUS SIGNATURE RECOGNITION

(75) Inventors: Neil John Hursey, Hertford Heath (GB); William Alexander McEwan, Newton Blossomville (GB)

(73) Assignee: McAfee, Inc., Santa Clara, CA (US)

( * ) Notice: Subject to any disclaimer, the term of this patent is extended or adjusted under 35 U.S.C. 154(b) by 880 days.

(21) Appl. No.: 09/916,714

(22) Filed: Jul. 26, 2001

(51) Int. Cl.[7] ............................................. G06F 17/30
(52) U.S. Cl. .................................. 707/102; 707/104.1
(58) Field of Search ............................. 707/102, 104.1

(56) References Cited

U.S. PATENT DOCUMENTS

| | | | | |
|---|---|---|---|---|
| 5,440,723 | A | * | 8/1995 | Arnold et al. ................... 714/2 |
| 5,442,699 | A | * | 8/1995 | Arnold et al. ................. 713/188 |
| 5,675,711 | A | * | 10/1997 | Kephart et al. ................ 706/12 |
| 5,948,104 | A | * | 9/1999 | Gluck et al. .................. 713/200 |
| 6,006,035 | A | * | 12/1999 | Nabahi .......................... 717/175 |
| 6,105,027 | A | * | 8/2000 | Schneider et al. .............. 707/9 |
| 6,721,721 | B1 | * | 4/2004 | Bates et al. ..................... 707/1 |

2002/0170052 A1 * 11/2002 Radatti ........................ 717/171

OTHER PUBLICATIONS

Corman et al, Introduction to Algorithms, the MIT Press, 1986, Section 5.5, pp. 91-97 and Chapter 13, pp. 244-262.*
Rabin, M., "Discovering Repetitions in Strings," Combinational Algorithms on Words, Apostolico and Galil eds. NATO ASI Series, vol. F12, pp. 270-288, 1985 (presented in Italy, Jun. 1984).
A. Apostolico and E. Guerrieri, "Linear Time Universal Compression Techniques for Dithered Images Based on Pattern Matching," (extended abstract), Proceedings Twenty-First Allerton Conference on Communications, Control, and Monticello, Illiois, pp. 70-79 (1975).

* cited by examiner

*Primary Examiner*—Wayne Amsbury
(74) *Attorney, Agent, or Firm*—Zilka-Kotab, PC; Christopher J. Hamaty

(57) ABSTRACT

A system, method and computer program product are provided for recognizing virus signatures. Initially, a list of virus signatures is provided. Next, the list of virus signatures is combined into a tree of virus signatures. Data is subsequently compared against the tree of virus signatures for virus signature recognition.

21 Claims, 4 Drawing Sheets

US 6,980,992 B1

TREE PATTERN SYSTEM AND METHOD FOR MULTIPLE VIRUS SIGNATURE RECOGNITION

FIELD OF THE INVENTION

The present invention relates to virus scanning, and more particularly to virus scanning utilizing database searching techniques.

BACKGROUND OF THE INVENTION

In database data processing systems, it is often desirable to provide efficient, high-speed data access and searching capabilities for data stored in a database. A typical database system provides an index mechanism for accessing records of data in the database, without having to search through each element of data stored in each data record. There are many database indexing, accessing and searching techniques in widespread use.

Tree-based indexes are one form of indexing and searching mechanism. In tree-based index database systems, a common data field in each database record is used as a keyword to create the index. The index is organized as a tree data structure, having a head node where searches begin, and one or more branch nodes referenced from the head node. All other nodes below the head node may also contain one or more branches referring to other nodes. Each index node contains one or more pointers, such as record numbers, to that node's respective data record within the database.

To search the tree index, a search value is provided by a user or program. The search value is then compared with node values beginning with the head node. At each node in the tree, if the search value occurs, for example, alphabetically before the current node's value, one branch may be followed to the next node, but if the search value occurs alphabetically after the current node's value, another branch to a different node may be taken. If the search value and node value are equal, a matching node has been found. The matching node's corresponding database record reference is used to retrieve the matching search data from the database.

These and other database tree-structure searching algorithms have been commonly used in the prior art for the purpose of searching databases. Other specific examples of such searching algorithms include Apostolico, Galil, and Oxford pattern matching algorithms. While such techniques are common in conventional database searching, they have not been applied to other technologies such as scanning data for virus signatures.

The generation and spread of computer viruses is a major problem in modern day computing. Generally, a computer virus is a program that is capable of attaching to other programs or sets of computer instructions, replicating itself, and performing unsolicited or malicious actions on a computer system. Generally, computer viruses are designed to spread by attaching to floppy disks or data transmissions between computer users, and are designed to do damage while remaining undetected. The damage done by computer viruses may range from mild interference with a program, such as the display of an unwanted political message in a dialog box, to the complete destruction of data on a user's hard drive.

It is estimated that new viruses are created at a rate of over 100 per month. This rate has resulted in a need for tens of thousands of virus signatures to be searched in suspect data. This, in turn, has resulted in virus searching algorithms requiring a large amount of time and computer resources when scanning for virus signatures. There is thus a need for the application of advanced techniques to optimize the virus scanning process.

DISCLOSURE OF THE INVENTION

A system, method and computer program product are provided for recognizing virus signatures. Initially, a list of virus signatures is provided. Next, the list of virus signatures is combined into a tree of virus signatures. Data is subsequently compared against the tree of virus signatures for virus signature recognition.

In one embodiment, the virus signatures may each include a sequence of characters. Further, the tree may include a plurality of branches each having a sequence of characters. By the nature of the tree structure, a portion of each branch may correspond to similar portions of a plurality of virus signatures. By this design, the efficiency of the virus signature recognition is improved since similar portions of the virus signatures need not be compared with the data more than once.

As an option, the characters may include wildcards. Further, the characters of the tree of virus signatures may be obfuscated to prevent detection during virus signature recognition. In use, viruses can be detected when stored in memory. Since the tree of virus signatures is loaded into memory, obfuscation is needed to prevent accidental self-detection of the tree of virus signatures.

In one aspect of the present embodiment, the branches may include upper branch portions and lower branch portions. When comparing, the data is compared against the upper branch portions of the tree. Thereafter, the data is compared against the lower branch portions of the tree if the data was successfully compared to the upper branch portions associated with the lower branch portions.

By this design, a virus signature is determined to be recognized upon the successful comparison of the data against an entirety of at least one branch. Moreover, the data is eligible to be declared clean upon the unsuccessful comparison of the data against an entirety of at least one branch.

DESCRIPTION OF THE PREFERRED EMBODIMENTS

Figure 1:
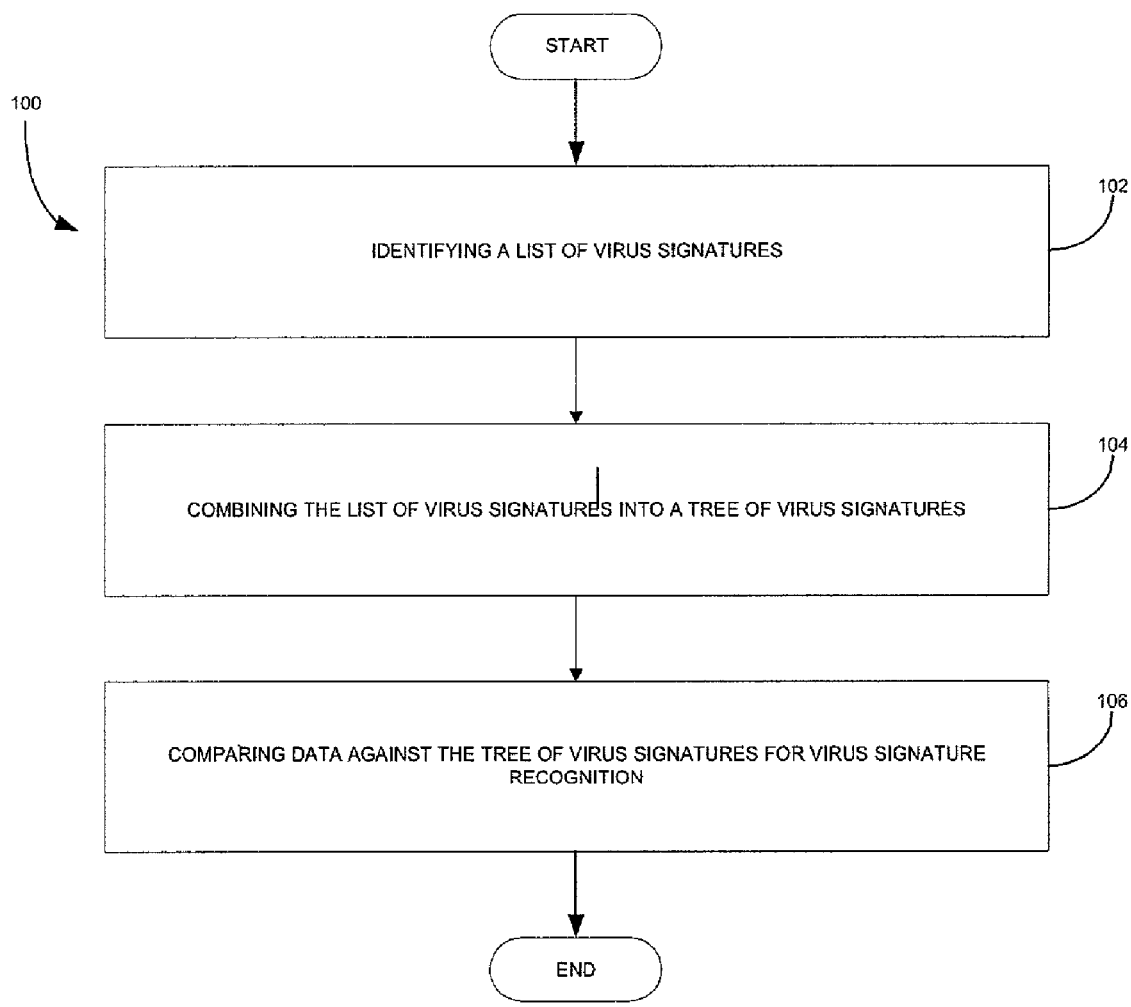
FIG. 1 illustrates a method for recognizing virus signatures, in accordance with one embodiment.

FIG. 1 illustrates a method 100 for recognizing virus signatures, in accordance with one embodiment. Initially, in operation 102, a list of virus signatures is provided. In the context of the present description, such virus signatures may include virus definitions, fingerprints, or any other data capable of identifying particular known viruses. Moreover, the term "virus" is meant to include any malicious or unwanted code, content, etc. that may be harmful to a system. In one embodiment, the list of virus signatures may be distributed via a periodic update, or simply be included in a virus scanning application program.

Next, in operation 104, the list of virus signatures is combined into a tree of virus signatures. In one embodiment, such tree includes a plurality of branches, and serves to reduce the amount of virus signature data that must be compared against suspect data during virus scanning. It should be noted that the tree may include any structure, entity, etc. that optimizes the efficiency of the virus scanning process.

Thereafter, in operation 106, suspect data is compared against the tree of virus signatures for virus signature recognition. Such suspect data may include application programs, static data, dynamic data or any other entity capable of carrying a computer virus. As such, the suspect data may be involved in an attempt to access data in memory or a network, process data, execute application programs, and/or any other situation that may make a system vulnerable to viruses or malicious software.

Figure 2:
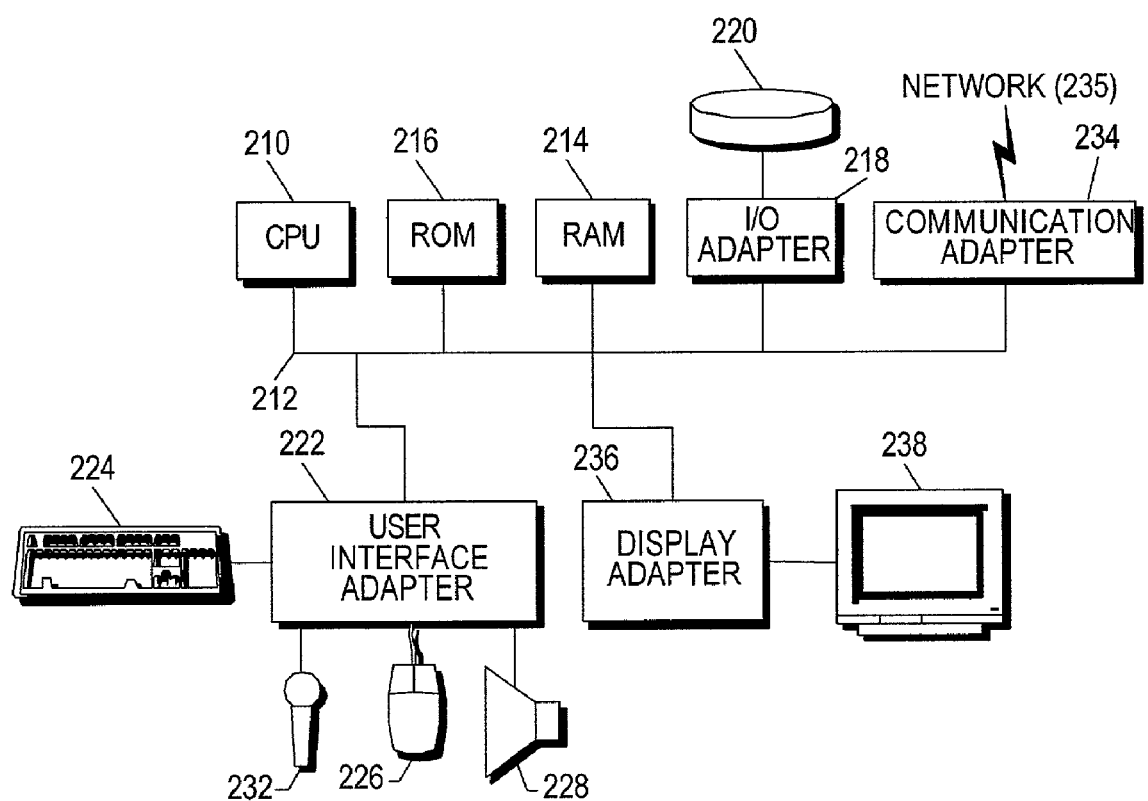
FIG. 2 shows a representative hardware environment with which the virus scanning may be executed, in accordance with one embodiment.

FIG. 2 shows a representative hardware environment with which the virus scanning may be executed, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
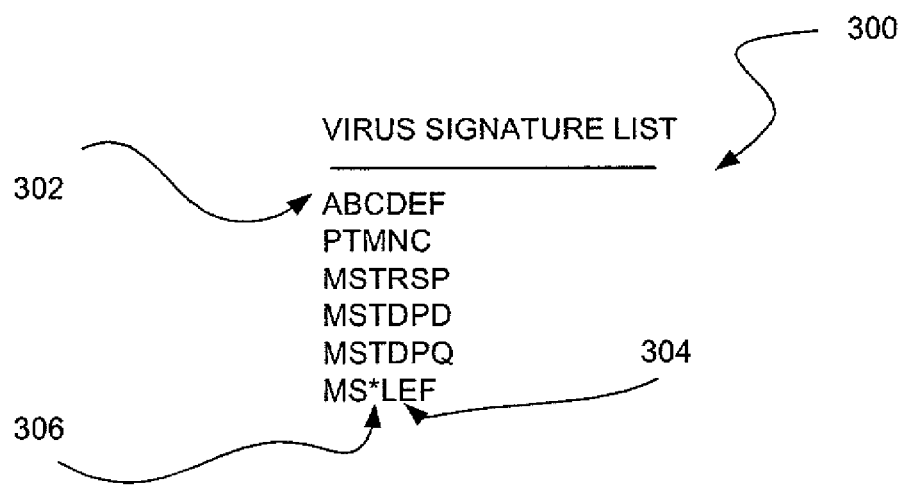
FIG. 3 illustrates an exemplary list of virus signatures.

FIG. 3 illustrates an exemplary list 300 of virus signatures 302 that is provided, in accordance with operation 102 of method 100 of FIG. 1. As shown, each virus signature 302 includes a sequence of characters 304 corresponding to a known virus.

It should be noted that such characters 304 may include any alphanumeric, Unicode, binary, or any other type of characters 304 that is capable of defining a virus. As an option, the characters 304 may include wildcards 306. In use, the wildcards 306 represent any specific character 304. In other words, the wildcards 306 will produce a match with any specific character 304 during the scanning process, in a manner that will soon become apparent.

Figure 4:
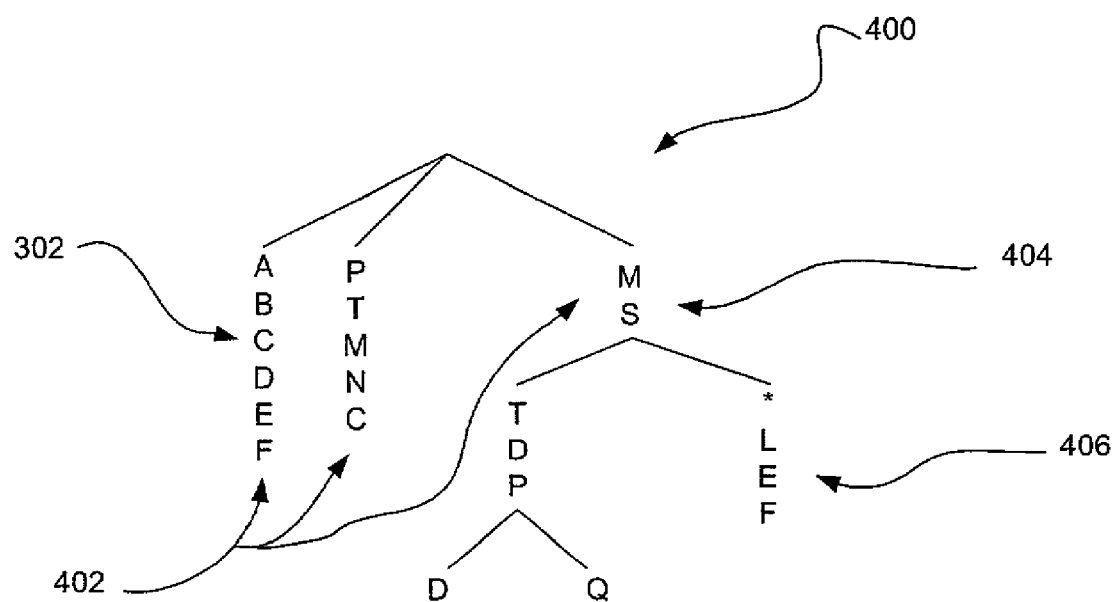
FIG. 4 shows an exemplary tree of virus signatures that is constructed in accordance with the method of FIG. 1.

FIG. 4 is an exemplary tree 400 of virus signatures 302 that is constructed in accordance with operation 104 during method 100 of FIG. 1. As shown, the tree 400 may include a plurality of branches 402 each having a sequence of characters 304.

In one aspect of the present embodiment, at least a portion of the branches 402 include upper branch portions 404 and lower branch portions 406. When conducting a comparison during a virus scan in accordance with operation 106 of method 100 of FIG. 1, suspect data is initially compared against the upper branch portions 404 of the tree. Thereafter, the data is compared against the lower branch portions 406 of the tree if the data was successfully compared to the upper branch portions 404 associated with the lower branch portions 406. More information regarding the operation of the virus scan in the context of the tree 400 will be set forth in greater detail during reference to a specific example of operation shown in FIG. 5.

By the nature of the tree structure, a portion of each branch 402 may correspond to sequenced characters 304 that are similar among a plurality of the virus signatures. By this design, the efficiency of the virus signature recognition is improved since similar portions of the virus signatures need not be compared with the data more than once.

Figure 5:
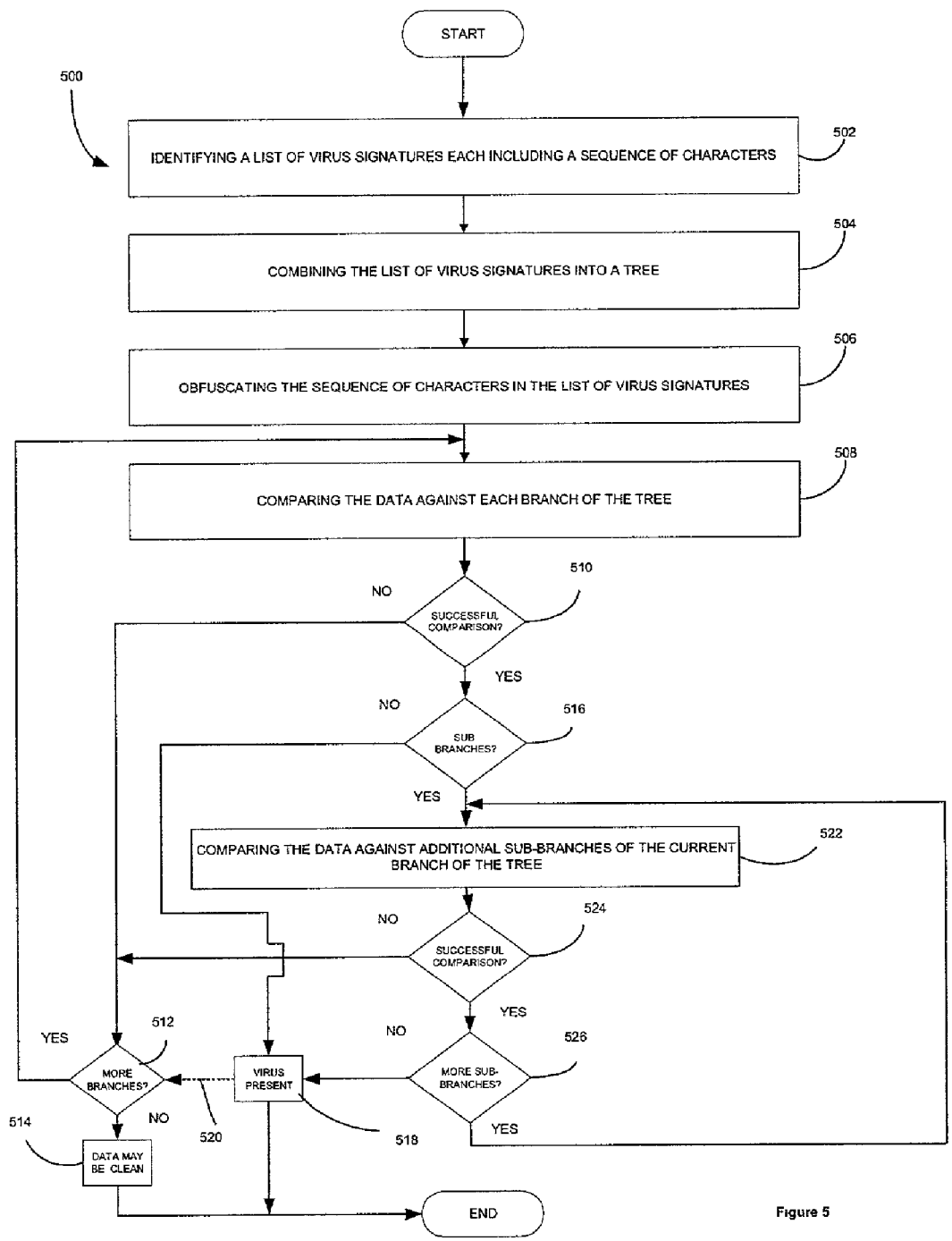
FIG. 5 illustrates a more complex method of recognizing virus signatures, in accordance with another embodiment.

FIG. 5 illustrates a more complex method 500 of recognizing virus signatures, in accordance with another embodiment. Such method 500 may be implemented in the context of the foregoing tree structure or in any other desired manner. As shown, a list 300 of virus signatures 302 each including a sequence of characters 304 is first provided in any desired way. See operation 502. As mentioned earlier, the list 300 of virus signatures 302 may be distributed via a periodic update or simply be included in a virus scanning application program.

Next, in operation 504, the list 300 of virus signatures 302 is combined into the structure of the tree 400. Again, such tree 400 may include the structure shown in FIG. 4 or any other structure, entity, etc. that optimizes the efficiency of the virus scanning process. For example, various other tree structures may be utilized in the context of Apostolico/Galil-editor, and/or Oxford-publisher] pattern searching algorithms. Moreover, the combining operation 504 may be carried out at run-time using the list 300 of virus signatures 302, or may be carried out earlier such that the tree 400 is distributed via a periodic update or is simply included in a virus scanning application program.

Optionally, consecutive character sequences without branches may be stored internally, "as is," in order to conserve memory. Normally, each node of the tree 400, except leaf nodes at the end of a branch 402, contain at least one pointer to the next node in the same branch 402. If there is only one such pointer (there is no branching off, just following the same branch 402), this pointer may be removed and the consecutive portion of the data can be stored "as is." The internal data structure may contain a flag to indicate the data was compressed in such a manner, rather than a normal tree branch 402. For example, if the strings "ABCDEF" and "ABCDXC" were the only strings to be stored, there would only be one point where the data branches (after 'D'). This allows the portions "ABCD", "EF", and "XC" to be stored as strings rather than breaking them up into nodes of the tree 400.

As an option, the sequence of characters 304 in the list 300 of virus signatures may be obfuscated. This may be done in order to prevent the virus signatures of the list 300 from being identified as actual viruses during the virus scan. In one embodiment, the obfuscation is accomplished by an exclusive-OR operation with a particular value.

As an option, some pre-processing may be done before the tree 400 is used for a particular search. The details of this pre-processing may depend on specific circumstances, but may typically include finding the correct location in the file where the virus may reside. Other processing may include decryption or emulation. For example, execution of the code may be emulated to see if a virus is found, but without carrying out any external action on the computer system.

In operation 508, suspect data is compared against each of the branches 402 of the tree 400. Such comparison may be prompted by any particular event such as an attempt to access data in memory or a network, process data, execute application programs, and/or any other situation that may make a system vulnerable to viruses or malicious software. The comparison operation 508 begins at a root node of the tree 400. That way, upper branch portions 404 of the tree 400 are compared first, before lower branch portions 406.

If it is determined in decision 510 that there is not a successful comparison of the upper branch portion 404 of the current branch 402, it is determined in decision 512 whether additional branches exist. If so, the process is continued with another branch in operation 508. If not, it is determined that no search strings were not found in the present piece of data in operation 514, and the data may be clean.

If it is determined in decision 510 that there is a successful comparison of the upper branch portion 404 of the current branch 402, it is then determined whether there are any sub-branches in decision 516. In other words, it is determined whether the current branch 402 has any lower branch portions 406. If not, it may be concluded that the data has been successfully compared to a full branch 402 corresponding to a virus signature, thus indicating that a virus is present in operation 518.

In response to the recognition of a virus, any desired security event may be initiated. For example, a repair routine may be initiated on the data, a quarantine process may be executed, or the data may be deleted. In any case, the virus scan may be terminated at that point, or, in the case of the repair routine being utilized, it may be determined whether additional branches exist in operation 512. Note phantom line 520.

If it is determined in decision 516 that there are indeed sub-branches, the lower branch portions 406 of the current branch 402 are compared against the data. See operation 522.

If it is determined in decision 524 that there is not a successful comparison of the current lower branch portion 406 of the present branch 402, it is determined in decision 512 whether additional branches exist. If so, the process is continued with another branch in operation 508. If not, it is determined that the data is clean in operation 514.

If it is determined in decision 524 that there is a successful comparison of the lower branch portion 406 of the current branch 402, it is then determined whether there are any more sub-branches in decision 526. If not, it may be concluded that the data has been successfully compared to a full branch 402 corresponding to a virus signature, thus indicating that a virus is present in operation 518. If it is determined that there are more sub-branches in decision 526, the method 500 is continued at operation 522.

In other words, a virus signature is declared to be recognized upon the successful comparison of the data against an entirety of at least one branch 402 (i.e. an upper branch portion 404 and a full sequence of any associated lower portion(s) 406 that end at a leaf node) of the tree 400. Moreover, the data is eligible to be declared clean upon the unsuccessful comparison of the data against an entirety of at least one branch 402 of the tree 400.

An example of the method 500 will now be set forth in the context of the tree 400 of FIG. 4, where the suspect data includes the string "MSTDPD." Initially, the first data character, "M," is compared against the upper branch portions 404 of the branches 402 of the tree 400. After being unsuccessfully compared to the first two branches 402 of the tree 400, the method 500 continues onto the third branch 402. Note operations 508–512 of FIG. 5. Since the "M" matches the third branch 402 of the tree 400 of FIG. 4, the process moves on to the next character "S." Since this constitutes a successful match, it is then determined whether there are any additional sub-branches in accordance with decision 516 of FIG. 5.

Since there are additional sub-branches, the comparison continues in operation 522. In particular, the current string successfully matches against the wild card character of one of the sub-branches, but fails at the "L" character. As such, the process continues on the other sub-branch. Since there is a successful comparison of the "T," "D," and "P" characters, the process continues to the lowermost branch portions including the "D" and "Q" characters. Since the "D" character renders a match, it is determined in operation 518 that a virus exists, and the scanning process may be terminated.

By this design, the efficiency of the virus signature recognition is improved since similar portions of the virus signatures do not need to be compared with the data more than once. In particular, the comparison operation may be executed at least 6–7 times faster than could be accomplished utilizing traditional methods.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for recognizing virus signatures, comprising
   (a) identifying a list of virus signatures;
   (b) combining the list of virus signatures into a tree of virus signatures; and
   (c) comparing data against the tree of virus signatures for virus signature recognition;
   wherein the virus signatures each include a sequence of characters;
   wherein the tree includes a plurality of branches each including a sequence of characters;
   wherein a portion of the branches corresponds to a plurality of the virus signatures;
   wherein the efficiency of the virus signature recognition is improved by reducing an amount of virus signature data that is compared against the data;
   wherein the branches include further sub-branches each corresponding to at least one virus signature;
   wherein the branches include upper branch portions and lower branch portions;
   wherein a pointer associated with a node of the tree is removed, if only one pointer exists, and an internal data structure includes a flag to indicate such removal.

2. The method as recited in claim 1, wherein the characters include wildcards.

3. The method as recited in claim 1, wherein the characters of the tree of virus signatures are obfuscated to prevent detection by the comparison.

4. The method as recited in claim 3, wherein the obfuscation prevents accidental self-detection of the tree of virus signatures.

5. The method as recited in claim 4, wherein the obfuscation is accomplished utilizing an exclusive-OR operation.

6. The method as recited in claim 1, wherein the comparing includes comparing the data against the upper branch portions of the tree.

7. The method as recited in claim 6, wherein the comparing further includes comparing the data against the lower branch portions of the tree if the data was successfully compared to the upper branch portions associated with the lower branch portions.

8. The method as recited in claim 7, wherein a virus signature is determined to be recognized upon the successful comparison of the data against an entirety of at least one branch that includes all of the characters of one of the virus signatures.

9. The method as recited in claim 7, wherein data is eligible to be declared clean upon the unsuccessful comparison of the data against an entirety of at least one branch that includes all of the characters of one of the virus signatures.

10. The method as recited in claim 1, wherein preprocessing is performed prior to use of the tree of virus signatures.

11. The method as recited in claim 10, wherein the pre-processing includes finding a correct location in a file where a virus resides, decryption, and emulation.

12. The method as recited in claim 1, wherein the virus signature recognition is improved since comparison of similar portions of the virus signatures with the data more than once is avoided.

13. A computer program product embodied on a computer readable medium for recognizing virus signatures, comprising
(a) computer code for identifying a list of virus signatures;
(b) computer code for combining the list of virus signatures into a tree of virus signatures; and
(c) computer code for comparing data against the tree of virus signatures for virus signature recognition;
wherein the virus signatures each include a sequence of characters;
wherein the tree includes a plurality of branches each including a sequence of characters;
wherein a portion of the branches corresponds to a plurality of the virus signatures;
wherein the efficiency of the virus signature recognition is improved by reducing an amount of virus signature data that is compared against the data;
wherein the branches include further sub-branches each corresponding to at least one virus signature;
wherein the branches include upper branch portions and lower branch portions;
wherein a pointer associated with a node of the tree is removed, if only one pointer exists, and an internal data structure includes a flag to indicate such removal.

14. The computer program product as recited in claim 13, wherein the characters include wildcards.

15. The computer program product as recited in claim 13, wherein the characters of the tree of virus signatures are obfuscated to prevent detection by the comparison.

16. The computer program product as recited in claim 13, wherein the comparing includes comparing the data against the upper branch portions of the tree.

17. The computer program product as recited in claim 16, wherein the comparing further includes comparing the data against the lower branch portions of the tree if the data was successfully compared to the upper branch portions associated with the lower branch portions.

18. The computer program product as recited in claim 17, wherein a virus signature is determined to be recognized upon the successful comparison of the data against an entirety of at least one branch that includes all of the characters of one of the virus signatures.

19. The computer program product as recited in claim 17, wherein data is eligible to be declared clean upon the unsuccessful comparison of the data against an entirety of at least one branch that includes all of the characters of one of the virus signatures.

20. A system for recognizing virus signatures, comprising
(a) logic for identifying a list of virus signatures;
(b) logic for combining the list of virus signatures into a tree of virus signatures; and
(c) logic for comparing data against the tree of virus signatures for virus signature recognition;
wherein the virus signatures each include a sequence of characters;
wherein the tree includes a plurality of branches each including a sequence of characters;
wherein a portion of the branches corresponds to a plurality of the virus signatures;
wherein the efficiency of the virus signature recognition is improved by reducing an amount of virus signature data that is compared against the data;
wherein the branches include further sub-branches each corresponding to at least one virus signature;
wherein the branches include upper branch portions and lower branch portions;
wherein a pointer associated with a node of the tree is removed if only one pointer exists, and an internal data structure includes a flag to indicate such removal.

21. A method for recognizing virus signatures with improved efficiency, comprising
(a) identifying a list of virus signatures each including a sequence of characters;
(b) combining the list of virus signatures into a tree of virus signatures including a plurality of branches each including a sequence of characters, wherein at least a portion of the branches includes upper branch portions and lower branch portions;
(c) obfuscating the sequence of characters in the tree of virus signatures;
(d) comparing the data against the upper branch portions of the tree;
(e) comparing the data against the lower branch portions of the tree if the data was successfully compared to the upper branch portions associated with the lower branch portions;
(f) declaring a virus signature to be recognized upon the successful comparison of the data against an entirety of at least one branch of the tree that includes all of the characters of one of the virus signatures; and
(g) determining that the data is eligible to be declared clean upon the unsuccessful comparison of the data against an entirety of at least one branch of the tree that includes all of the characters of one of the virus signatures;
wherein a portion of the branches corresponds to a plurality of the virus signatures;
wherein the efficiency of the virus signature recognition is improved by reducing an amount of virus signature data that is compared against the data;
wherein the branches include further sub-branches each corresponding to at least one virus signature;
wherein a pointer associated with a node of the tree is removed, if only one pointer exists, and an internal data structure includes a flag to indicate such removal.

* * * * *

UNITED STATES PATENT AND TRADEMARK OFFICE
CERTIFICATE OF CORRECTION

PATENT NO. : 6,980,992 B1  
APPLICATION NO. : 09/916714  
DATED : December 27, 2005  
INVENTOR(S) : Hursey et al.

Page 1 of 1

It is certified that error appears in the above-identified patent and that said Letters Patent is hereby corrected as shown below:

In the claims:  
col. 8, line 29 change "removed if" to --removed, if--.

Signed and Sealed this

Sixth Day of May, 2008

JON W. DUDAS  
*Director of the United States Patent and Trademark Office*